United States Patent
Zhukov et al.

(10) Patent No.: US 8,169,379 B2
(45) Date of Patent: May 1, 2012

(54) PORTABLE MULTIBAND ANTENNA

(75) Inventors: Vladimir Zhukov, Moscow (RU);
Dmitry Dubrovsky, Moscow (RU);
Victor Petrusinski, Moscow (RU);
Alexander Andreevich Vyazov,
Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 709 days.

(21) Appl. No.: 12/371,503

(22) Filed: Feb. 13, 2009

(65) Prior Publication Data
US 2010/0211314 A1   Aug. 19, 2010

(51) Int. Cl.
*H01Q 21/00* (2006.01)
(52) U.S. Cl. .......... 343/879; 343/906; 343/700 MS; 343/895; 343/772; 342/357.77; 342/357.36
(58) Field of Classification Search ............ 343/906, 343/878, 879, 895, 772, 700 MS; 342/357.77, 342/357.36
See application file for complete search history.

(56) References Cited

U.S. PATENT DOCUMENTS

| | | | |
|---|---|---|---|
| 6,091,358 A | 7/2000 | Maniscalco et al. | |
| 6,107,960 A | 8/2000 | Krasner | |
| 6,363,123 B1 | 3/2002 | Balodis | |
| 6,608,998 B1 | 8/2003 | Neumann et al. | |
| 7,043,364 B2 * | 5/2006 | Scherzinger | 701/213 |
| 7,221,313 B2 | 5/2007 | Ganguly et al. | |
| 2004/0196182 A1 * | 10/2004 | Unnold | 342/357.07 |
| 2006/0279727 A1 * | 12/2006 | Nichols et al. | 356/139.01 |
| 2007/0275658 A1 * | 11/2007 | Gaal et al. | 455/12.1 |
| 2009/0179793 A1 * | 7/2009 | Remondi | 342/357.04 |

OTHER PUBLICATIONS

Neumann, J. B. et al. (Sep. 14-17, 1999). "GLONASS Receiver Inter-Frequency Biases—Calibration Methods and Feasibility," ION GPS '99, Nashville, Tennessee, pp. 329-337.

* cited by examiner

*Primary Examiner* — Dieu H Duong
(74) *Attorney, Agent, or Firm* — Morrison & Foerster LLP

(57) ABSTRACT

A portable DGPS navigation apparatus is provided. The apparatus includes a receiver assembly and a DGPS antenna assembly. The receiver assembly includes a GNSS antenna, a GNSS receiver, and a DGPS modem. The DGPS antenna assembly includes a DGPS antenna; a top connector for coupling the DGPS antenna assembly to the receiver assembly such that the receiver assembly and DGPS antenna assembly are aligned with a geodetic pole, and a bottom connecter.

11 Claims, 3 Drawing Sheets

US 8,169,379 B2

PORTABLE MULTIBAND ANTENNA

FIELD OF THE INVENTION

The present invention relates to a portable differential Global Positioning System (DGPS) navigational system.

BACKGROUND OF THE INVENTION

Satellite Positioning System antennas and receivers, such as those for the Global Positioning System (GPS) and for the Global Navigation Satellite System (GLONASS) discussed below, are now used for many applications requiring determination of the observer's location anywhere on or in the vicinity of the Earth.

A differential GPS (DGPS) receiver includes a GPS antenna to receive the GPS signals transmitted from one or more GPS satellites, a GPS processor to calculate the GPS antenna's position mid time of observation of that position from the GPS signals, a display processor to convert the GPS position and observation time into information that is useful for an application, and a display to present the information to the user, and a DGPS antenna and processor to receive and apply differential corrections to produce GPS signals with improved accuracy. The GPS antenna must be positioned with a direct line of sight to the GPS satellite or satellites from which the receiver receives GPS signals.

Typically, GPS devices used in DGPS applications require numerous separate, distinct component units which are connected via cables. For example, the GPS receiver and processor would constitute one unit and the terrestrial radio would constitute a second unit, which would be coupled to the GPS processor via a cable. Typically, an input/output (I/O) unit which includes a display for data monitoring and a keypad for data input is also required. The I/O unit is coupled to the GPS receiver/processor unit and to the terrestrial radio via cable. Some systems also require the attachment of a separate battery via cable. Because multiple separate units are used in these prior art systems, the systems are bulky and difficult to move around.

For example, one type of GPS receiver, generally referred to as "handheld," includes a GPS antenna, a GPS processor, a display processor, and a display in a single unit. Another type of GPS receiver system places the GPS antenna in an antenna unit and the display in a separate display unit. The GPS processor and the display processor may be contained in the GPS antenna unit, the display unit, or in a separate unit. In both of these GPS receiver systems, the DGPS radio antenna and receiver are provided in a separate unit or units, which are connected to the GPS processor. The handheld format allows the user to separate the GPS antenna and the display units so that the GPS position and time information can be observed and operated upon in a protected environment.

However, using cables and connectors to couple multiple units of the DGPS systems often creates problems related to reliability and durability. This is particularly true for DGPS systems which are mobile because of the jarring and shaking of the system from use and movement. Additionally, the systems are expensive to manufacture and assemble. Furthermore, the connections are often bulky, expensive and prone to breakage or malfunction. In addition, it is difficult to move the various boxes and cables around.

Furthermore, typical GPS unit receivers are separated by long distances or by immobile structures. Therefore, radio relay units are used to get the signal from one GPS unit to anther GPS unit. Previous radio relay systems for relaying GPS signals typically include multiple separate components such as a transceiver operating at one frequency which is coupled via cable to a separate transceiver operating at a second frequency. These relay systems receive signals through an antenna which is connected to a processor by a cable, which is then connected to a radio by a cable, which rebroadcasts the signal through an antenna attached by cable to the radio.

These relay systems are bulky and difficult to move around. Furthermore, these relay systems typically are expensive and are difficult to maintain and operate due to the fact that each of the components of the radio relay system is unique. Additionally, most of the currently available systems are not durable and reliable enough for applications that require portability, such as surveying.

Therefore, a Differential Global Positioning System (DGPS) apparatus, contained in a single antenna-like package is desired. This will allow the user to place a GPS antenna in a direct line of sight from one or more GPS satellites, to operate and observe the position and/or observation time display in-a protected environment; and receive and process differential GPS radiowave signals to determine the corrected location and/or observation time for the device using GPS methods. Such a system would have portability, durability, reliability, and be inexpensive to manufacture and assemble.

SUMMARY OF THE INVENTION

According to embodiments of the invention, a portable DGPS navigation apparatus is provided. The apparatus includes a receiver assembly and a DGPS antenna assembly. The receiver assembly includes a GNSS antenna, a GNSS receiver, and a DGPS modem. The DGPS antenna assembly includes a DGPS antenna; a top connector for coupling the DGPS antenna assembly to the receiver assembly such that the receiver assembly and DGPS antenna assembly are aligned with a geodetic pole, and a bottom connecter.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

Embodiments of the invention relate to mounting a separate DGPS antenna to a receiver assembly. The receiver body may include the GNSS antenna, GNSS receiver, and DGPS modem. Coupled to the receiver body via a connector is a DGPS antenna assembly, such that the receiver body and the DGPS antenna assembly may be connected to the geodetic pole.

In this configuration, antenna mounting allows eliminating DGPS antenna radio signal influence on GNSS receiver positioning precision. The configuration, according to embodiments of the invention, minimizes the DGPS antenna interference on the GNSS antenna. For example, the antenna configuration reduces the interference from the electromagnetic field and having a mechanical element in the near field region of the GNSS antenna. According to embodiments of the invention, the configuration of the DGPS antenna is more stable and will reduce damage to the antenna.

Therefore, embodiments of the invention provide, especially for a single user, portability of a multiband antenna system that is accurate and durable is an important feature. Furthermore, embodiments that provide preservation of the configuration of the DGPS antenna is desirable.

Figure 1:
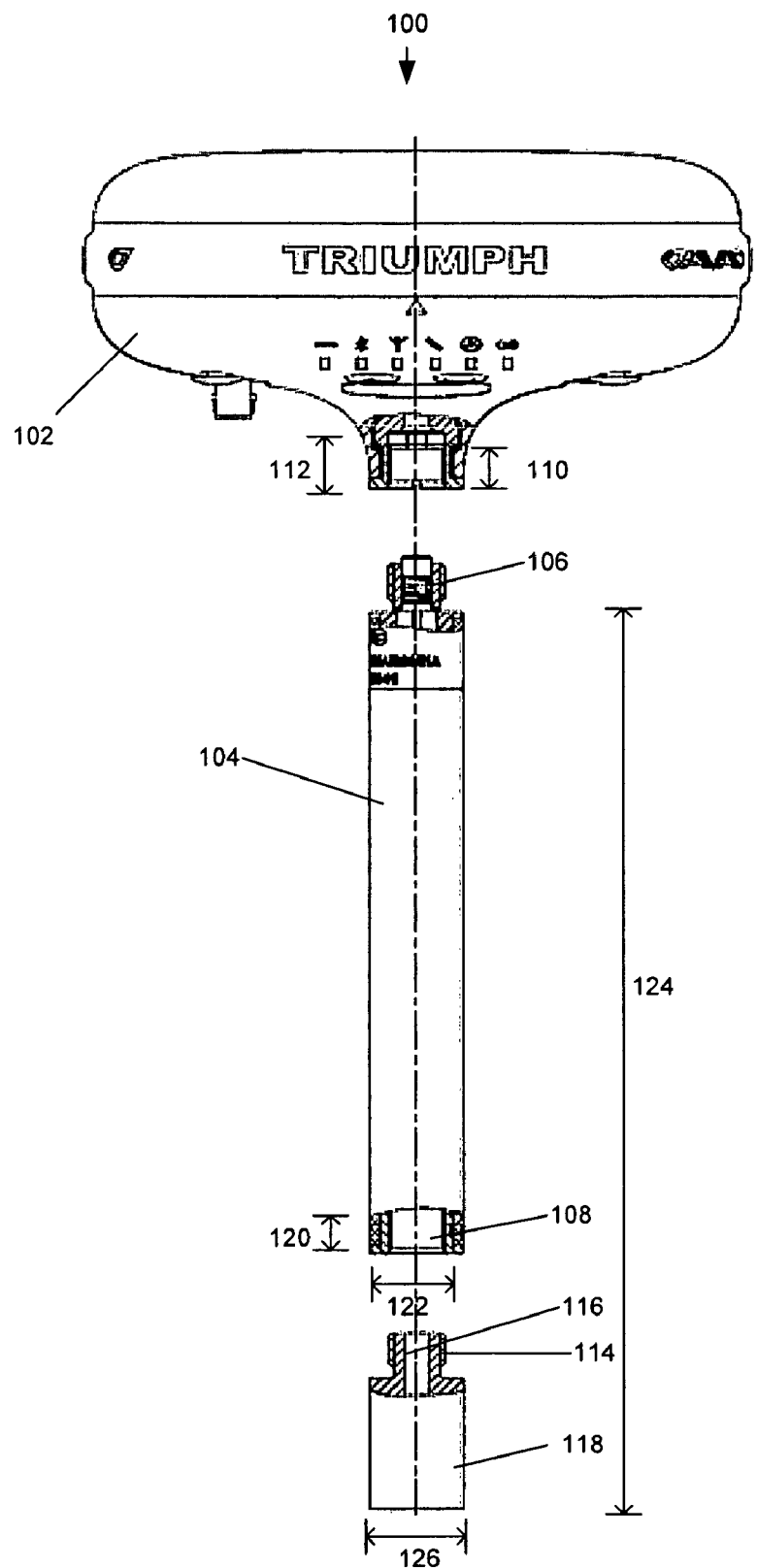
FIG. 1 illustrates an expanded side-view of a navigation apparatus including a DGPS antenna assembly according to embodiments of the invention.

FIG. 1 illustrates a portable navigation apparatus 100 including a DGPS antenna assembly according to embodiments of the invention. The receiver body 102 includes a GNSS antenna. Coupled to the receiver body 102 is a DGPS antenna assembly 104. The DGPS antenna assembly 104 is included in the support of the portable navigation apparatus 100. The DGPS antenna assembly 104 includes a threaded insert 106 that fits into a threaded hole of the receiver body 102 to mechanically connect DGPS antenna assembly 104 to receiver body 102. The threaded insert 106 may be a metal such as brass, for example. A further support 118, constructed from a dielectric material, is coupled to the DGPS antenna assembly 104 by a threaded insert 116 of the further support 118. The threaded insert 116 may mechanically connect by screwing into the threaded hole 108 of the DGPS antenna assembly 104.

The threaded inserts 106 and 114 may be brass and have ⅝" threads in some embodiments. The dimensions of the threaded inserts and threaded holes are such that the further support 118, the DGPS antenna assembly 104, and the receiver body 102 are mechanically connected to provide a durable and stable portable navigation apparatus 100. The threaded connectors allow for easy assembly.

In some embodiments, the threaded hole of the receiver body has a depth 110 of 0.60-0.65 inches. The length of the overall hole, however, may be 0.70 inches.

The diameter 122 of the DGPS antenna assembly 104 and the diameter 126 of the further support 118 are similar so that the different components become part of the overall support of the portable navigational apparatus 100. In embodiments, the DGPS antenna assembly diameter 122 and the further support diameter 126 are 1.25 inches.

Figure 2:
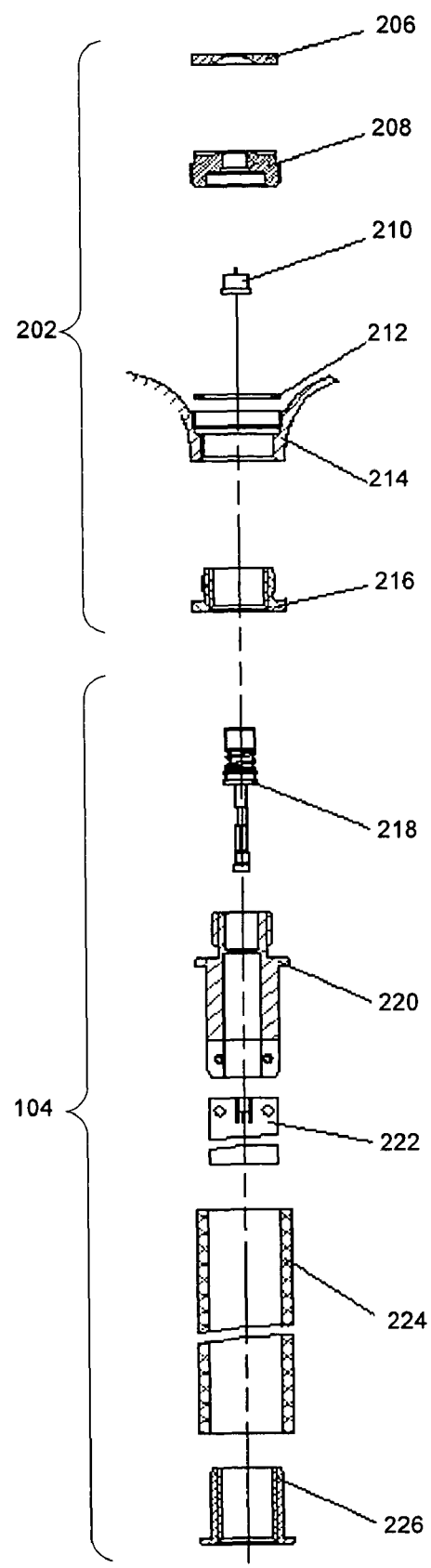
FIG. 2 illustrates an unassembled navigation apparatus according to embodiments of the invention.

Enclosed in the receiver body 102 is a receiver assembly 202. FIG. 2 illustrates the receiver assembly 202, which is directly connected to the DGPS antenna assembly 104. The components and indications of the connections of the receiver assembly and the DGPS antenna assembly are illustrated in FIG. 2, according to embodiments of the invention. The receiver assembly includes a UHF/GSM connector washer 206

Inserted into the receiver body base 214 is an insert 216. The insert 216 may be made of brass, for example. The insert 216 is fixed in the receiver body base 214 to allow a mechanical connection of the DGPS antenna assembly 104 to the receiver assembly 202.

The connection between the DGPS antenna assembly 104 and the receiver assembly allows for RF signals to communicated to the DGPS modem, included in the receiver body, from the DGPS antenna. A UHF/GSM connector washer 206 is mechanically coupled to a second UHF/GSM connector washer 208 to create a UHF/GSM connector washer assembly in embodiments of the invention. An RF connector 210 is inserted into the UHF/GSM washer assembly. The RF connector 210 transmits the RF signals from the DGPS antenna 222 to a DGPS modem. The RF connector 210 may be similar to a plug shape so that it is fitted into the UHF/GSM washer assembly by pressing. Furthermore, an O-ring 212 is used to further seal the connection between the UHF/GSM washer 208 and the insert 216. The O-ring 212 may be made of silicone.

According to embodiments of the invention, the DGPS antenna assembly 104 includes a DGPS antenna 222 and connectors to connect the DGPS antenna assembly to the receiver body 102 and the further support 118.

An RF cable 218 is inserted into a UHF/GSM connector neck 220.

The UHF/GSM connector neck 220 mechanically connects the DGPS antenna to the receiver assembly 202. The RF cable 218 electrically connects to the RF connector 210 to transmit the RF signals from the DGPS antenna 222 to the DGPS modem located in the receiver body. The RF cable 218 is connected to the DGPS antenna 222. The DGPS antenna 222 may be a pin, strip, spiral, or waveguide radiating element, for example.

The RF cable 218, UHF/GSM connector neck 220, and DGPS antenna 222 are inserted into an antenna tube 224. The antenna tube is a radio transparent tube. It is necessary that the antenna tube 224 is a radio transparent tube so that the radio signal is not attenuated, and/or entirely blocks the direction and gain of the antenna, rendering the antenna inoperable.

Furthermore, the bottom connector 226 is inserted into the bottom of the antenna tube 224. The bottom connector 226 is used to connect the DGPS antenna assembly to the further support of the portable navigation apparatus to connect the DGPS antenna to the geodetic pole.

Figures 3A, 3B:
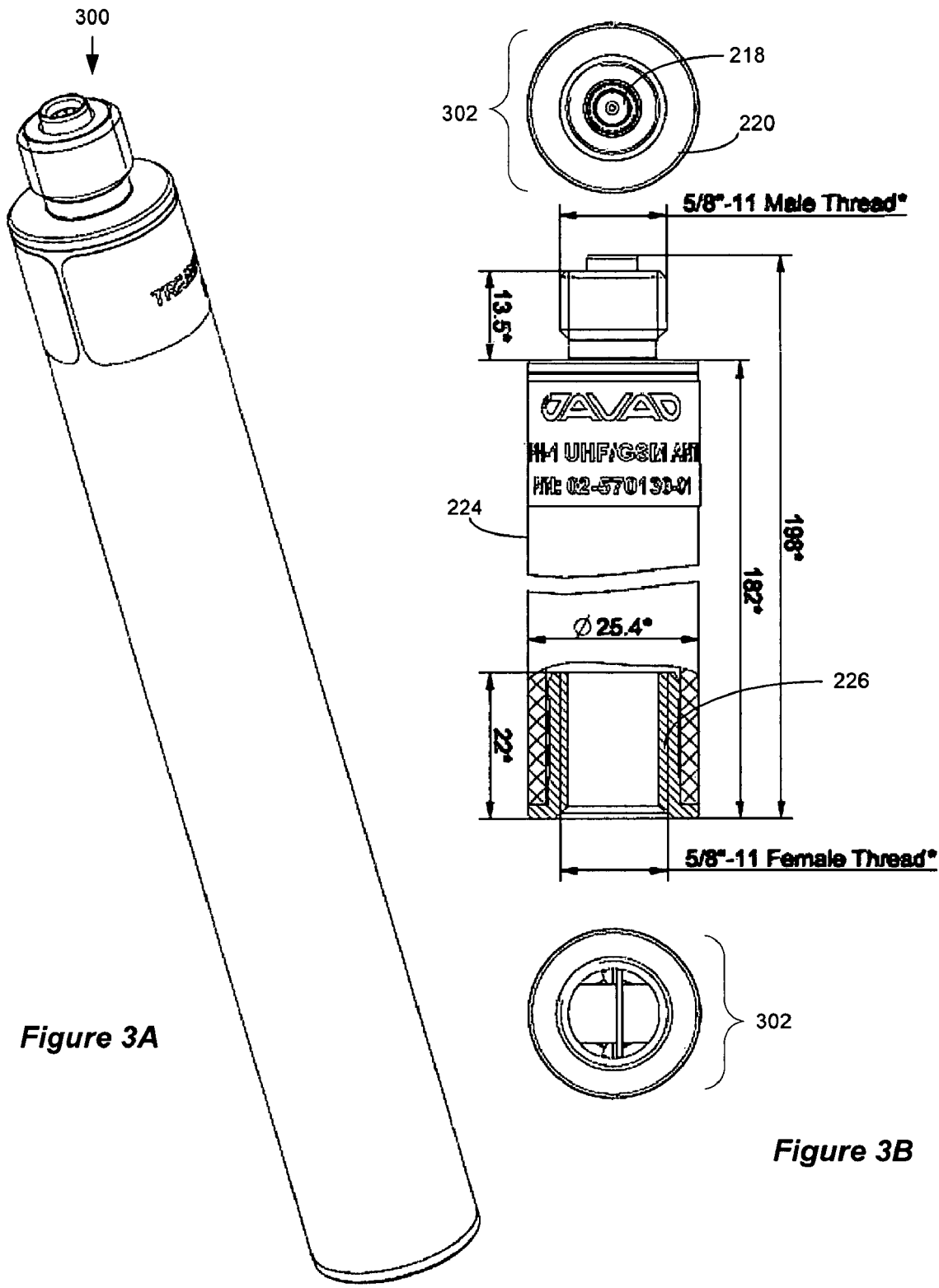
FIG. 3A illustrates an assembled DGPS antenna assembly according to embodiments of the invention.
FIG. 3B illustrates a perspective view of an assembled DGPS antenna assembly according to embodiments of the invention.

FIG. 3A illustrates an assembled DGPS antenna assembly 300. FIG. 3B illustrates a perspective view of an assembled DGPS antenna assembly. The antenna tube 224 and top and bottom connectors are illustrated. The top view of the top connector 302 shows the RF cable 218 and the UHF/GSM connector neck 220. The bottom view of the bottom connector 304 is also illustrated.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A navigation apparatus for decreasing interference between Global Navigation Satellite System (GNSS) signals and Differential Global Positioning System (DGPS) signals, the apparatus comprising:
   a receiver assembly for receiving GNSS positioning information, wherein the receiver assembly comprises:
      a GNSS antenna,
      a GNSS receiver, and
      a DGPS modem; and
   a DGPS antenna assembly, wherein the DGPS antenna assembly comprises:
      a DGPS antenna;
      a top connector for coupling the DGPS antenna assembly to the receiver assembly such that the receiver assembly and DGPS antenna assembly are aligned with a geodetic pole, and
      a bottom connecter.

2. The navigation apparatus of claim 1, further comprising a radio frequency (RF) cable for connecting the DGPS antenna to the DGPS modem.

3. The navigation apparatus of claim 1, wherein the DGPS antenna is one of a group consisting of: a pin, strip, spiral, and waveguide.

4. The navigation apparatus of claim 1, wherein the bottom connector connects the DGPS antenna assembly to a support.

5. The navigation apparatus of claim 1, wherein the receiver assembly further comprises a receiver connector assembly for connecting the receiver assembly to the top connector of the DGPS antenna assembly, the receiver connector assembly comprising at least one washer connected to a plug and an o-ring.

6. The navigation apparatus of claim 1, wherein the DGPS antenna assembly further comprises an antenna tube, wherein the DGPS antenna is located within the antenna tube.

7. The navigation apparatus of claim 1, wherein the top connector for coupling the DGPS antenna assembly to the receiver assembly is a thread.

8. The navigation apparatus of claim 7, wherein the thread is brass.

9. The navigation apparatus of claim 1, wherein the bottom connecter is for connecting the DGPS antenna assembly to a support.

10. The navigation apparatus of claim 9, wherein the bottom connector is a thread.

11. The navigation apparatus of claim 10, wherein the thread is brass.

* * * * *